US008341116B2

(12) United States Patent
Trivedi et al.

(10) Patent No.: US 8,341,116 B2
(45) Date of Patent: Dec. 25, 2012

(54) SYSTEMS AND METHODS FOR UPDATING AN LDAP

(75) Inventors: Prakash A. Trivedi, Centreville, VA (US); Kurt W. Robohm, Leesburg, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2101 days.

(21) Appl. No.: 10/097,868

(22) Filed: Mar. 15, 2002

(65) Prior Publication Data

US 2002/0138489 A1    Sep. 26, 2002

Related U.S. Application Data

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
*G06F 7/00* (2006.01)
*G06F 17/00* (2006.01)

(52) U.S. Cl. ............... 707/625; 707/634; 707/687

(58) Field of Classification Search .......... 707/1, 201, 707/202, 609, 610, 624, 625, 634, 687
See application file for complete search history.

(56) References Cited

U.S. PATENT DOCUMENTS

| | | | | |
|---|---|---|---|---|
| 5,043,871 A | * | 8/1991 | Nishigaki et al. | 707/202 |
| 5,727,202 A | * | 3/1998 | Kucala | 707/10 |
| 5,845,292 A | * | 12/1998 | Bohannon et al. | 707/202 |
| 5,884,324 A | * | 3/1999 | Cheng et al. | 707/201 |
| 5,937,343 A | | 8/1999 | Leung | |
| 6,009,103 A | | 12/1999 | Woundy | |
| 6,044,381 A | | 3/2000 | Boothby et al. | |
| 6,081,806 A | * | 6/2000 | Chang et al. | 707/8 |
| 6,092,083 A | | 7/2000 | Brodersen et al. | |
| 6,321,236 B1 | * | 11/2001 | Zollinger et al. | 707/203 |
| 6,343,287 B1 | * | 1/2002 | Kumar et al. | 707/4 |
| 6,377,950 B1 | * | 4/2002 | Peters et al. | 707/10 |
| 6,510,450 B1 | * | 1/2003 | Ricart et al. | 709/203 |
| 6,516,327 B1 | * | 2/2003 | Zondervan et al. | 707/201 |
| 6,611,849 B1 | * | 8/2003 | Raff et al. | 707/203 |
| 6,615,223 B1 | * | 9/2003 | Shih et al. | 707/201 |
| 6,654,891 B1 | * | 11/2003 | Borsato et al. | 726/6 |
| 6,708,187 B1 | * | 3/2004 | Shanumgam et al. | 707/201 |
| 7,062,563 B1 | * | 6/2006 | Lewis et al. | 709/227 |
| 7,124,204 B2 | * | 10/2006 | Givoly et al. | 709/248 |

(Continued)

FOREIGN PATENT DOCUMENTS

EP    1039685 A2  *  9/2000

(Continued)

OTHER PUBLICATIONS

Xin Wang, Henning Schulzrine, Dept. of Computer Science, Columbia U. & Dilip Kandlur, Dinesh Verma, IBM Research Center. Measurement and Analysis of LDAP Performance. Pub. 2001.*

(Continued)

*Primary Examiner* — Marc Somers

(57) ABSTRACT

A system updates a lightweight directory access protocol (LDAP) database based on changes made to a second database. The system determines differences between Internet Protocol (IP) communication service records stored in the second database and IP communication service records stored in the LDAP database and creates a transaction file based on the differences. The system updates the LDAP database using the transaction file.

20 Claims, 11 Drawing Sheets

U.S. PATENT DOCUMENTS

| | | | | |
|---|---|---|---|---|
| 2001/0007103 | A1* | 7/2001 | Breiter et al. | 707/1 |
| 2001/0014893 | A1* | 8/2001 | Boothby | 707/201 |
| 2002/0156798 | A1* | 10/2002 | Larue et al. | 707/201 |
| 2003/0023874 | A1* | 1/2003 | Prokupets et al. | 713/201 |
| 2007/0016627 | A1* | 1/2007 | McCaw | 707/201 |

FOREIGN PATENT DOCUMENTS

| | | |
|---|---|---|
| JP | 2000-112802 | 4/2000 |
| WO | 00/78004 | 12/2000 |

OTHER PUBLICATIONS

Compaq. Chapter 4: LDAP Directory Synchronization. White paper. pp. 1-11. Copyright Software.com INC, 2000.*

Gary L. Anderson. Novell. How to Supercharge LDAP Searches with NDS eDirectory Indexes. Jul. 1, 2000.*

W. Yeong et al., "Lightweight Directory Access Protocol", RFC 1777, Mar. 1995, pp. 1-16.

"Businessware Overview", www.vitria.com, pp. 1-2, print date Mar. 14, 2002.

"Netegrity SiteMinder 4.6", www.netegrity.com, p. 1, print date Mar. 14, 2002.

"The iPlanet Web Server Keeps Data Safe", www.iplanet.com, p. 1, print date Mar. 14, 2002.

* cited by examiner

SYSTEMS AND METHODS FOR UPDATING AN LDAP

RELATED APPLICATION

This application claims priority under 35 U.S.C. §119(e) based on U.S. Provisional Application Ser. Nos. 60/276,923, 60/276,953, 60/276,954, and 60/276,955, all filed Mar. 20, 2001, the disclosures of which are incorporated herein by reference.

FIELD OF THE INVENTION

The present invention relates generally to communications systems and, more particularly, to an operational support system that ensures that a lightweight directory access protocol (LDAP) database contains the most recent Internet Protocol (IP) communications service information.

BACKGROUND OF THE INVENTION

Telecommunications service providers continually increase the number of services and products they offer to customers. A recent trend, for example, is a desire to offer broadband, wireless, and Internet services. As competition increases, service providers must provide an increased level of support for these advanced data services while keeping costs down.

Service providers also desire the ability to allow users (e.g., system administrators, engineers, and customers) to modify attributes associated with these advanced data services and to implement these modifications in near real time. By way of example, an attribute may relate to how Voice over Internet Protocol (VoIP) calls are routed to and from a customer. To ensure that calls are processed correctly after modifications have been made, it is important that the devices used for processing the calls, such as a redirect server, contain the most up to date information. When a redirect server experiences a fault or is taken off-line for some period of time, the redirect server will not contain any updates (or modifications) made during this period. Therefore, it is important that the device(s) from which the redirect server obtains updates contains the most recent IP communications service information.

Accordingly, there is a need in the art for systems and methods that ensure that redirect servers obtain the most up to date information.

SUMMARY OF THE INVENTION

Systems and methods consistent with the principles of the invention address this and other needs by providing an operational support system that ensures that redirect servers obtain the most up to date information for processing calls in an Internet Protocol (IP) communications network during those times, for example, when the redirect server has been taken off-line for some period of time.

In an implementation consistent with the present invention, a method for updating a lightweight directory access protocol (LDAP) database based on changes made to a second database is disclosed. The method includes determining differences between IP communication service records stored in the second database and IP communication service records stored in the LDAP database, creating a transaction file based on the differences, and updating the LDAP database using the transaction file.

In another implementation consistent with the present invention, a method for updating a LDAP database is disclosed. The method includes comparing one or more first tables to one or more second tables, where the one or more first tables includes a set of current records and the one or more second tables includes records from the LDAP database. The one or more first tables and the one or more second tables are stored in a second database. The method further includes identifying one or more transactions based on the comparing and updating the LDAP database based on the one or more identified transactions.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of this invention provide an operational support system that ensures that IP communications service processing reflect the most recent IP communications service information.

Exemplary System

Figure 1:
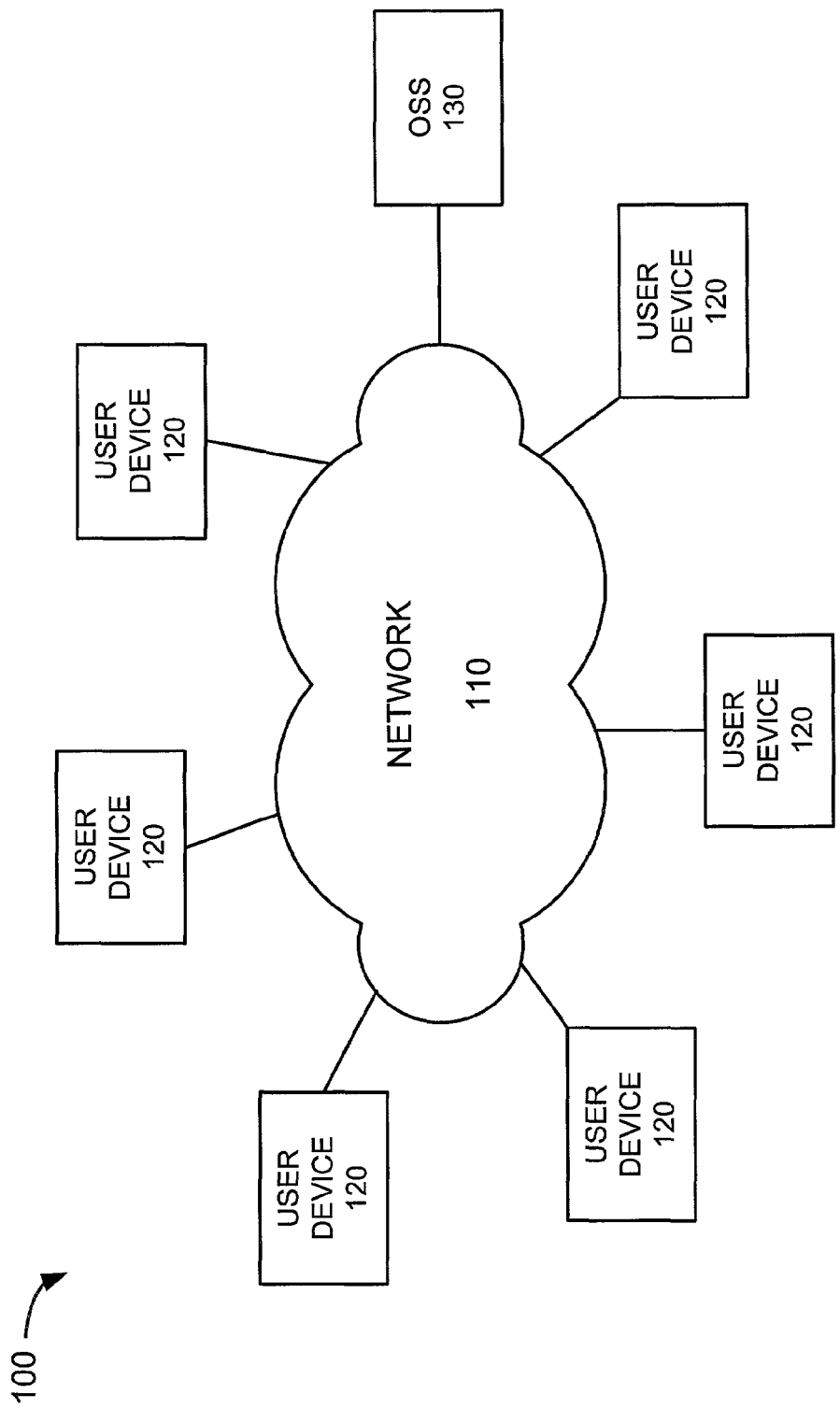
FIG. 1 illustrates an exemplary system in which systems and methods, consistent with the present invention, may be implemented.

FIG. 1 illustrates an exemplary system 100 in which systems and methods, consistent with the present invention, may be implemented. In FIG. 1, system 100 includes a network 110 that interconnects a group of user devices 120 and an operational support system (OSS) 130. It will be appreciated that a typical system may include more or fewer devices than illustrated in FIG. 1. Moreover, system 100 may include additional devices (not shown) that aid in the transfer, processing, and/or reception of data.

The network 110 may include, for example, the Internet, an intranet, a local area network (LAN), a metropolitan area network (MAN), a wide area network (WAN), a public switched telephone network (PSTN), and/or some other similar type of network. In fact, the network 110 may include any type of network or combination of networks that permits routing of information from a particular source to a particular destination.

The user devices 120 may include a type of computer system, such as a mainframe, minicomputer, or personal computer, a type of telephone system, such as a POTS telephone or a session initiation protocol (SIP) telephone, and/or some other similar type of device that is capable of transmitting and receiving information to/from the network 110. The user device 120 may connect to the network via any conventional technique, such as a wired, wireless, or optical connection.

Figure 2:
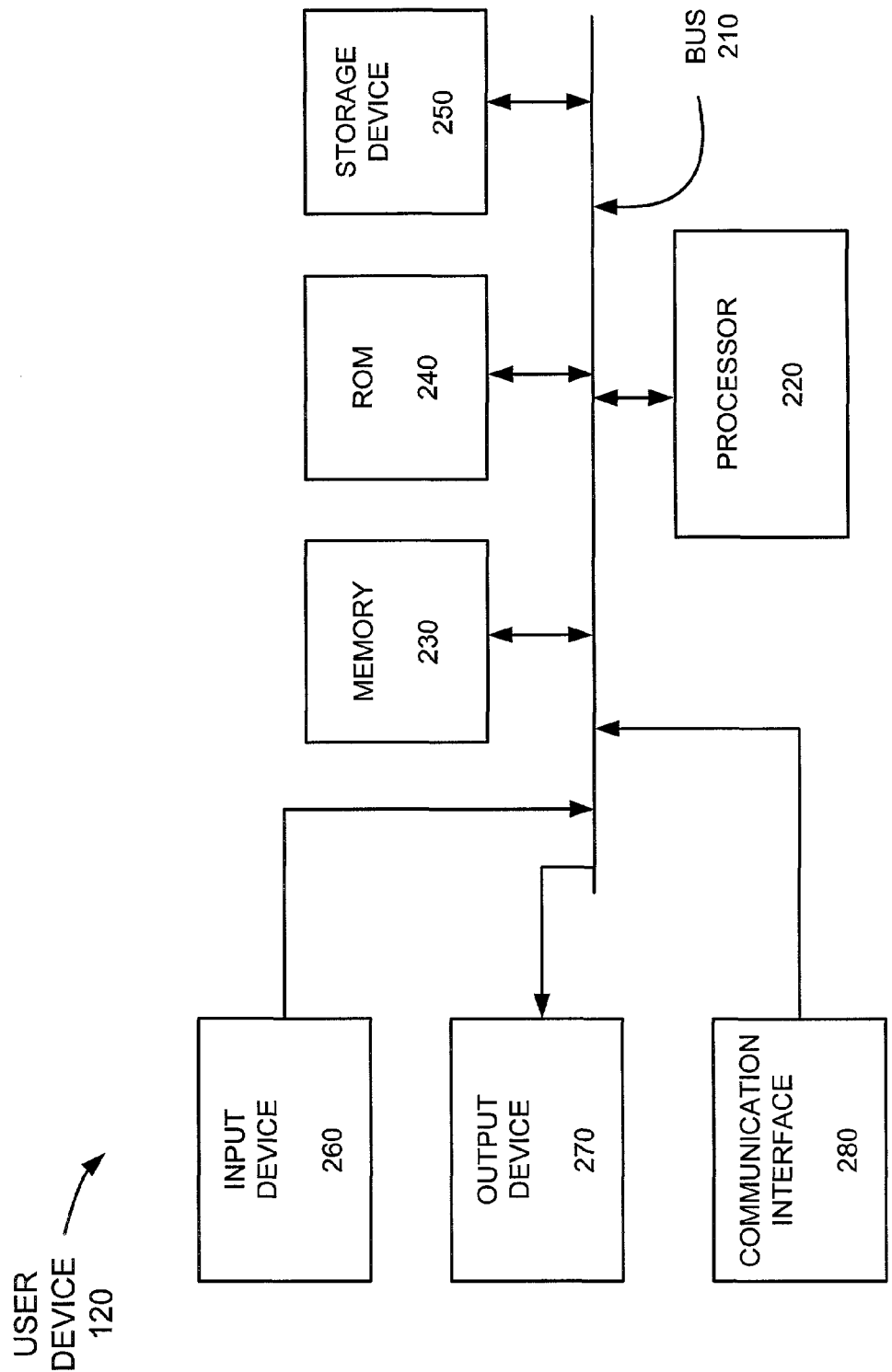
FIG. 2 illustrates an exemplary configuration of a user device of FIG. 1 in an implementation consistent with the present invention.

FIG. 2 illustrates an exemplary configuration of a user device 120 of FIG. 1 in an implementation consistent with the present invention. In FIG. 2, the user device 120 includes a bus 210, a processor 220, a memory 230, a read only memory (ROM) 240, a storage device 250, an input device 260, an output device 270, and a communication interface 280. The bus 210 may include one or more conventional buses that permit communication among the components of the user device 120.

The processor 220 may include any type of conventional processor or microprocessor that interprets and executes instructions. In one implementation consistent with the present invention, the processor 220 executes the instructions to cause a web browser to be displayed to an operator of the user device 120. As will be described in more detail below, the operator may access and modify attributes associated with the OSS 130 via this web browser.

The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism or combination of mechanisms that permits the operator to input information to the user device 120, such as a keyboard, a mouse, a microphone, a pen, a biometric input device, such as voice recognition device, etc. The output device 270 may include any conventional mechanism or combination of mechanisms that outputs information to the operator, including a display, a printer, a speaker, etc.

The communication interface 280 may include any transceiver-like mechanism that enables the user device 120 to communicate with other devices and/or systems, such as OSS 130. For example, the communication interface 280 may include a modem or an Ethernet interface to a network.

Returning to FIG. 1, the OSS 130 provides the infrastructure for integrating data from traditional telephony services and applications with advanced data application platforms. Through OSS 130, customers, using, for example, user device 120, may manage, configure, and provision traditional telephony and advanced data services in real time, obtain real time billing information, and generate reports using a rules-centric middleware core. In one embodiment, a customer may perform these functions through a single point of entry using an Internet accessible web interface.

Figure 3:
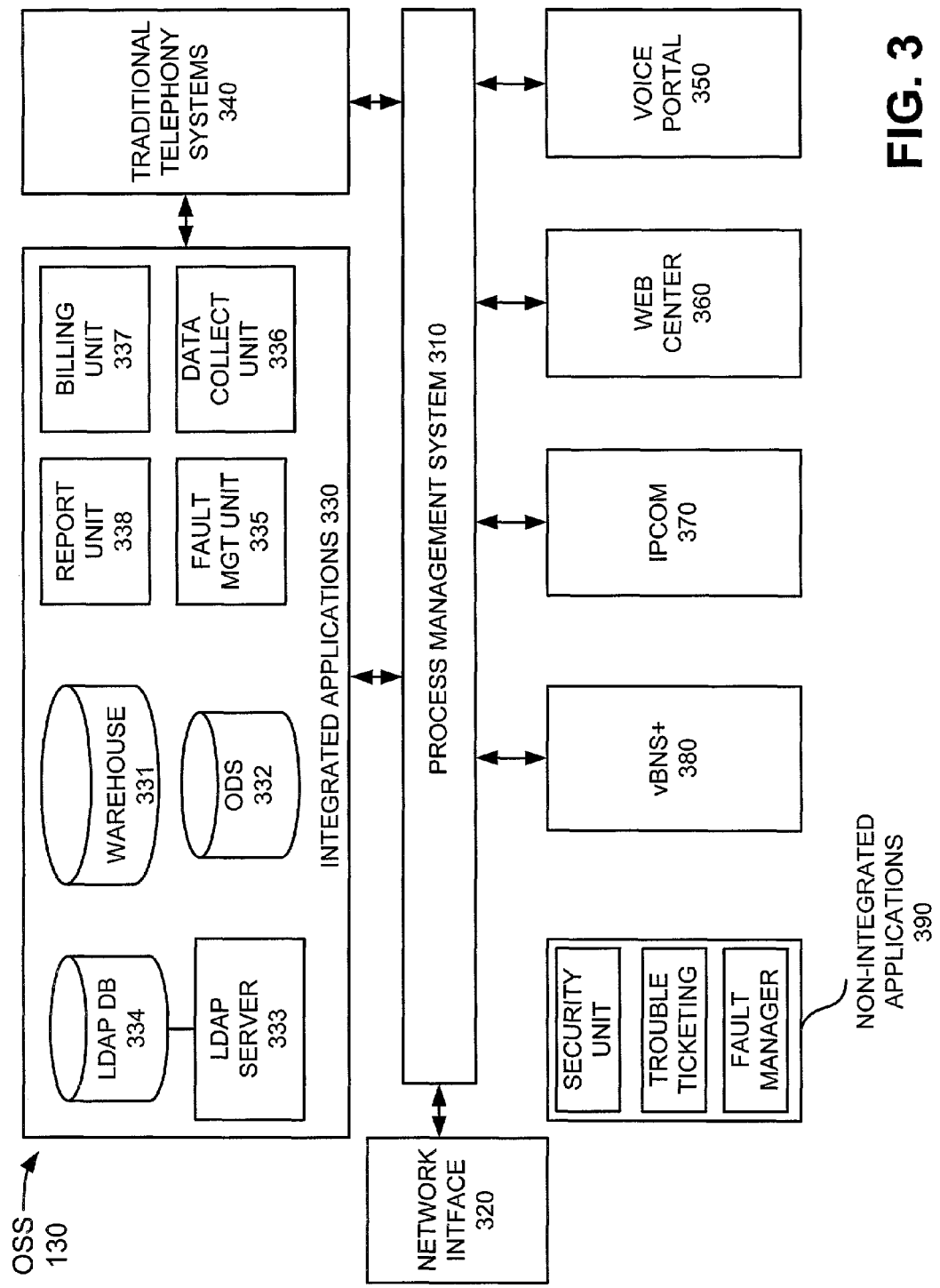
FIG. 3 illustrates an exemplary configuration of the operational support system of FIG. 1 in an implementation consistent with the present invention.

FIG. 3 illustrates an exemplary configuration of the OSS 130 of FIG. 1 in an implementation consistent with the present invention. As illustrated, the OSS 130 includes a process management system 310, a network interface 320, a group of integrated applications 330, a group of traditional telephony systems 340, a voice portal unit 350, a web center unit 360, an IPCOM unit 370, a very high performance backbone network service (vBNS+) unit 380, and a group of non-integrated applications 390. It will be appreciated that the OSS 130 may include other components (not shown) that aid in receiving, processing, and/or transmission of data.

The process management system 310 acts as the backbone to the OSS 130 by providing graphical process automation, data transformation, event management, and flexible connectors for interfacing with OSS components. In one implementation consistent with the present invention, the process management system 310 uses a Common Object Request Broker Architecture (CORBA) based publish-and-subscribe messaging middleware to integrate the different components of the OSS 130. Other techniques for integrating the different components of the OSS 130 may alternatively be used, such as eXtensible Markup Language (XML) or Enterprise Java-Beans (EJB). The process management system 310 may, for example, be implemented using Vitria Technology Inc.'s BusinessWare software system.

The network interface 320 provides a graphical user interface that allows users (e.g., customers, engineers, account teams, and the like) to access the components of the OSS 130. The network interface 320 may include commercial off the shelf (COTS) software or hardware packages, such as Siteminder® by Netegrity, Inc. and/or iPlanet™ by Sun Microsystems, Inc., custom software or hardware, or a combination of custom software/hardware and COTS software/hardware.

Via the network interface 320, customers may, for example, request that service be connected or disconnected, monitor or change network or user settings, obtain reports, and perform e-billing, account management, and trouble reporting and tracking functions in a real time manner. The network interface 320 may, for example, allow engineers to submit transactions to control and configure network elements and services in a real time manner. The network interface 320 may, for example, allow account teams to manage account creations and cancellations, generate sub-accounts from master accounts, access current account data, and access historical account data. As will be described in additional detail below, the network interface 320 allows the service attributes associated with the IPCOM unit 370 to be configured and controlled remotely, such as over the Internet, via a user device 120.

The network interface 320 authenticates users and controls actions that authenticated users are allowed to execute in the OSS 130. In one implementation consistent with the present invention, the network interface 320 allows users access to the components of the OSS 130 via a single sign-on technique. This single sign-on eliminates the need for users to sign in (or authenticate themselves) in order to access different components of the OSS 130. Once authenticated, users may access those components of the OSS 130 to which they have been provided authorization.

The integrated applications 330 may include, for example, a data warehouse 331, an operational data store (ODS) 332, a lightweight directory access protocol (LDAP) based server 333, an LDAP database 334, a fault management unit 335, a data collection unit 336, a billing unit 337 and a reporting unit 338. The data warehouse 331 may include one or more separate databases for storing data. The data warehouse 331 acts as a repository for service order, account, usage and performance data. In one implementation, the data warehouse 331 may be implemented as a relational database management system (RDBMS) and may include a server (not shown) that controls access to the data warehouse 331.

The ODS 332 may also include one or more separate databases for storing data. The ODS 332 temporarily stores data that is used in the course of fulfilling, for example, account creation, service order management, and network provisioning operations. The ODS 332 also stores authentication and authorization data. This data defines users' roles and privileges. Like the data warehouse 331, the ODS 332 may be a RDBMS and may include a server (not shown) that controls access to the ODS 332.

The LDAP server 333 may be a general directory server that controls access to the LDAP database 334. The LDAP database 334 may be an LDAP-based repository that stores information associated with users in a hierarchical, tree-like structure. For example, the LDAP database 334 may store attributes for a user that may include preferences associated with the following exemplary services: call blocking, follow-me, call forwarding, voice mail, conference calling, single line extension, call screening, quality of service, class of service, dial plan restrictions, dynamic registration, secondary directory number and call transfer. The LDAP database 334 may store this information as one or more directory entries for each user. Each directory entry may include an identifier associated with the user and a collection of attributes associated with the user. Each of the attributes may include a type and one or more values that identify the user's settings associated with that type. In this manner, the LDAP server 333 and LDAB database 334 provide a system that enables the user's preferences regarding various services to be stored, searched, updated and retrieved in a quick and efficient manner.

The LDAP server 333 and LDAP database 334 are shown as separate devices. It should be understood, however, that these two devices may both be part of the same directory server in implementations consistent with the present invention. Additional information regarding LDAP can be found in W. Yeong et al., "Lightweight Directory Access Protocol," RFC 1777, March 1995, which is incorporated herein by reference.

The fault management unit 335 monitors and manages the operation of the OSS 130. The fault management unit 335 may receive information from every device, computer and application in the OSS 130 via the process management system 130. In situations where a fault has been detected, the fault management unit 335 may transmit a trouble ticket identifying the fault to the appropriate system administrator.

The data collection unit 336 collects customer usage and performance data for the devices supported by the OSS 130, transforms the data, if necessary, and passes the data on to the appropriate device, such as the billing unit 337. In one implementation, the data collection unit 336 utilizes a hierarchical architecture, having a centralized manager that defines and manages collection and data transformation schemas. Individual, lower level gatherers interface with source targets.

The billing unit 337 receives customer usage and performance data from the data collection unit 336 and generates bills in a well-known manner based thereon. The billing unit 337 may be configured with a variety of rating rules and plans and may provide mechanisms to manage and create rating plans, as well as mechanisms for building revenue reports and generating billing reports. The rating rules may be customized based on a particular customer's requirements or generalized. The rating rules may include traditional telephony styled rating rules that include time-of-day, day-of-week, distance-based, flat rate, non-recurring, and recurring on a definably regular basis, such as weekly, bi-weekly, monthly, etc., ratings. In an exemplary implementation of the present invention, the billing unit 337 may also provide bonus points, airline miles, and other incentive items as part of the rules-based rating and billing service.

Billing unit 337 may provide revenue and billing reports to authorized parties. Billing unit 337 may allow customers to access previous invoices and view current charges not yet billed. In an exemplary implementation consistent with the present invention, billing unit 337 may transfer rated events and summary records into other billing and revenue systems. For example, billing unit 337 may receive and transfer billing information or event information to a legacy billing system (i.e., an existing billing system) that generates the actual bill. In alternative implementations, billing unit 337 may provide hard copy bills and/or provide electronic bills to a customer. In this implementation, billing unit 337 may be configured to perform electronic payment handling.

As customer orders and accounts are created or modified through normal business functions, the OSS 130 keeps the billing unit 337 up to date in a real time manner via the process management system 310. Authorized parties may also extract real time data from the billing unit 337.

The reporting unit 338 may interact with various components of the OSS 130, such as the ODS 332 and billing unit 337, to provide users (i.e., customers, engineers, and accountants) with the ability to obtain reports based on real time data. The reports may include, for example, billing reports, reports regarding the usage and/or performance of the network, etc.

The traditional telephony systems 340 may include one or more components that are typically used in a telecommunications network. In one implementation, the traditional telephony systems 340 include one or more legacy systems, such as an order entry system, provisioning system, billing system, and the like.

The voice portal unit 350 provides a variety of information services to subscribers. These services may include, for example, banking, brokerage, and financial services, travel and entertainment services, distribution and shipping services, insurance services, health and pharmaceutical services, manufacturing services, and the like. The voice portal unit 350 may store subscriber profiles to determine a subscriber's device preference (e.g., a cellular telephone, a personal digital assistant, a paging device, and the like) and may also track a subscriber's access to the services for billing purposes.

The web center 360 acts as a virtual call center by queuing, routing, and distributing communications from any first location to an appropriate agent at any second location. The web center 360 allows agents to handle multiple mediums (e.g., inbound telephone calls, faxes, e-mails, voicemail, VoIP transactions, etc.) via a single browser-based interface.

The IPCOM unit 370 may include one or more devices that provide VoIP services to subscribers. The subscribers may make and receive calls via an IP communications network using, for example, session initiation protocol (SIP) telephones. The IPCOM unit 370 may support the following exemplary services: follow me, call blocking, call forwarding, voice mail, conference calling, single line extension, call screening, quality of service, class of service, dial-plan restrictions, dynamic registration, secondary directory number, and call transfer. As described above, customers may set or change attributes associated with these features via the network interface 320.

The vBNS+ unit 380 provides the IP infrastructure for the IP communications network. The vBNS+ unit 380 may include a group of routers that route packets in the network. The non-integrated applications 390 may include, for example, a security unit, a trouble ticketing unit, and a fault manager. The security unit may include one or more firewalls for securing the network interface 320, telephone equipment (e.g., PBX, switch, and redirect server), and network operations. The trouble ticketing unit manages the issuance and resolution of trouble tickets. The fault manager monitors the hardware components of the OSS 130.

Figure 4:
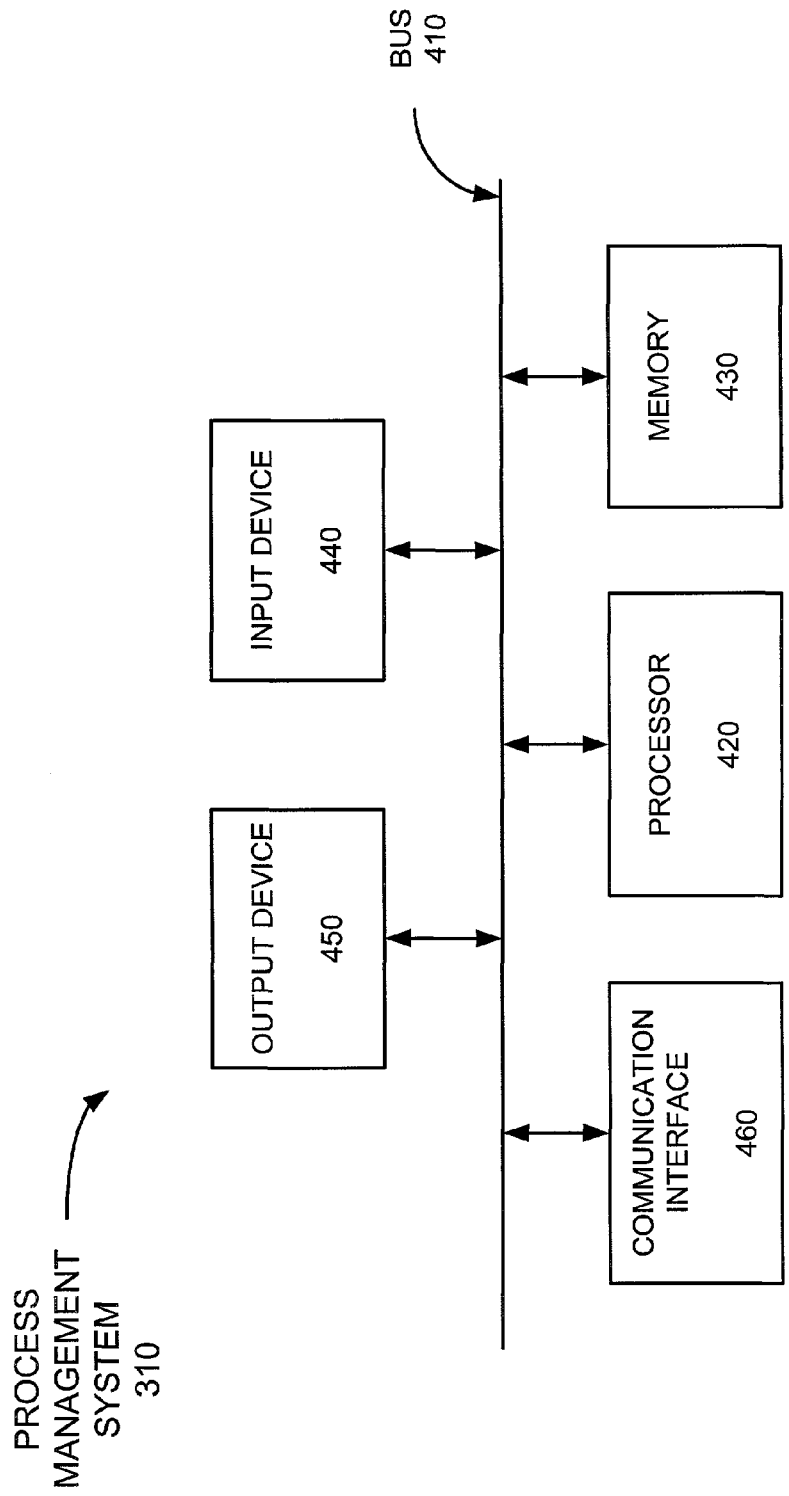
FIG. 4 illustrates an exemplary configuration of the process management system of FIG. 3 in an implementation consistent with the present invention.

FIG. 4 illustrates an exemplary configuration of the process management system 310 of FIG. 3 in an implementation consistent with the present invention. As illustrated, the process management system 310 includes a bus 410, a processor 420, a memory 430, an input device 440, an output device 450, and a communication interface 460. The bus 410 permits communication among the components of the process management system 310.

The processor 420 may include any type of conventional processor or microprocessor that interprets and executes instructions. The memory 430 may include a RAM or another type of dynamic storage device that stores information and instructions for execution by the processor 420; a ROM or another type of static storage device that stores static information and instructions for use by the processor 420; and/or some type of magnetic or optical recording medium and its corresponding drive.

The input device 440 may include any conventional mechanism or combination of mechanisms that permits an operator to input information to the process management system 310, such as a keyboard, a mouse, a pen, a biometric mechanism, and the like. The output device 450 may include any conventional mechanism or combination of mechanisms that outputs information to the operator, including a display, a printer, a speaker, etc. The communication interface 460 may include any transceiver-like mechanism that enables the process management system 310 to communicate with other devices and/or systems, such as the network interface 320, integrated applications 330, traditional telephony systems 340, etc. via a wired, wireless, or optical connection.

Execution of the sequences of instructions contained in a computer-readable medium, such as memory 430, causes processor 420 to implement the functional operations described below. In alternative embodiments, hardwired circuitry may be used in place of or in combination with software instructions to implement the present invention. Thus, the present invention is not limited to any specific combination of hardware circuitry and software.

Figure 5:
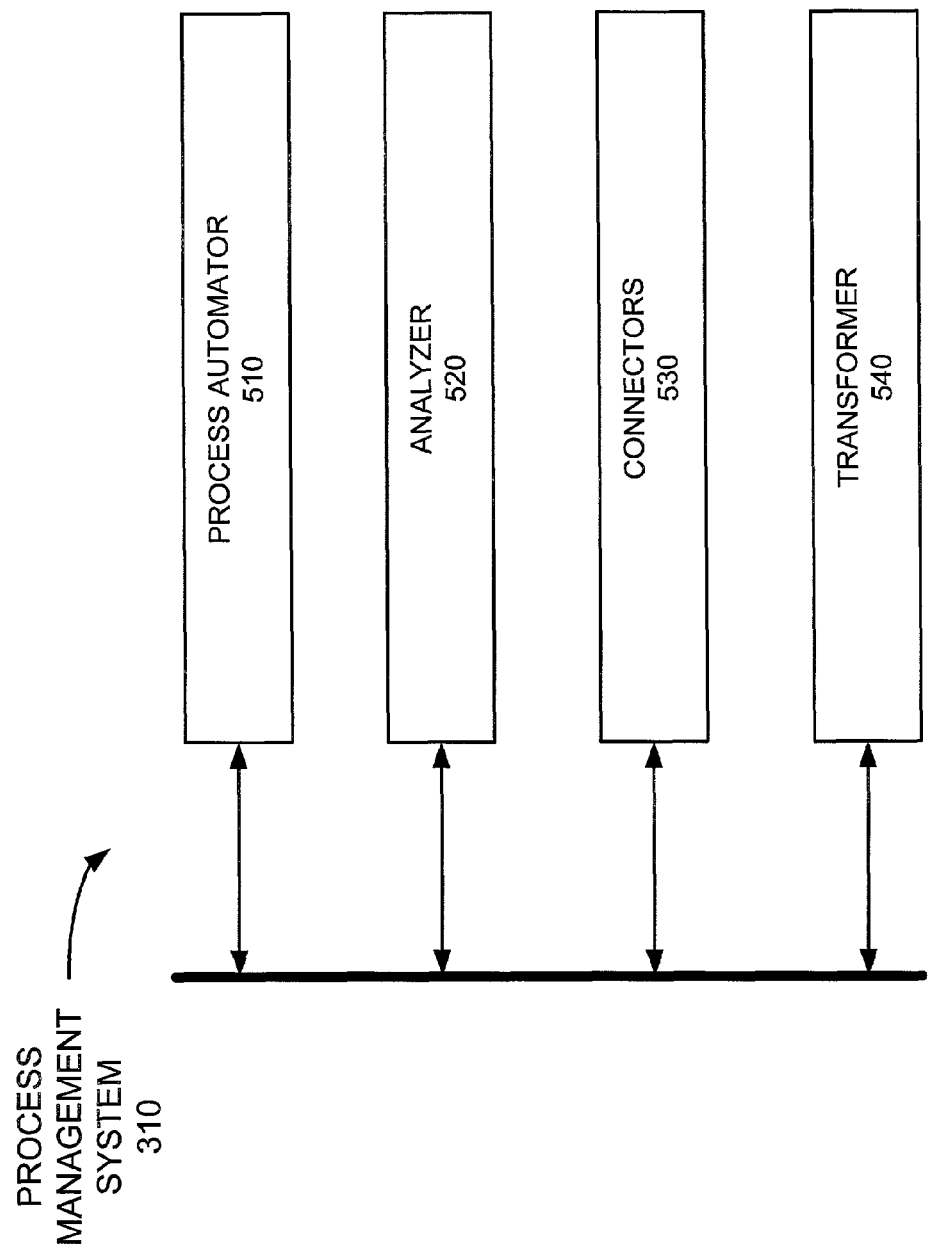
FIG. 5 illustrates an exemplary functional block diagram of the process management system of FIG. 3 in an implementation consistent with the present invention.

FIG. 5 illustrates an exemplary functional block diagram of the process management system 310 of FIG. 3 in an implementation consistent with the present invention. As illustrated, the process management system 310 includes a process automator 510, an analyzer 520, a group of connectors 530, and a transformer 540. It will be appreciated that the process management system 310 may include additional functional elements (not shown) that aid in the reception, processing, and/or transmission of data.

The processor automator 510 includes a modeling tool that allows event processing to be visually modeled by engineers and product development analysts. The process automator 510 can then execute these models to create an automated business process. The analyzer 520 provides on-going and real time monitoring of the components of the OSS 130. The analyzer 520 delivers reports, history, and trending on events processed through the process management system 310.

The connectors 530 include a group of customized rules that allows the components of the OSS 130 to interact and communicate with the process management system 310. A unique connector 530 may be established for each component in the OSS 130. As new components are added to the OSS 130, new connectors 530 are established to allow the new components to communicate with the existing components of the OSS 130. Once the connectors 530 have been established, the OSS components may communicate with the process management system 310 via standard messaging or through full publish/subscribe processing. The transformer 540 inspects data received by the connectors 530. The transformer 540 may also transform the data received by the connectors 530, if necessary, prior to the data being transferred on to its destination.

Figure 6:
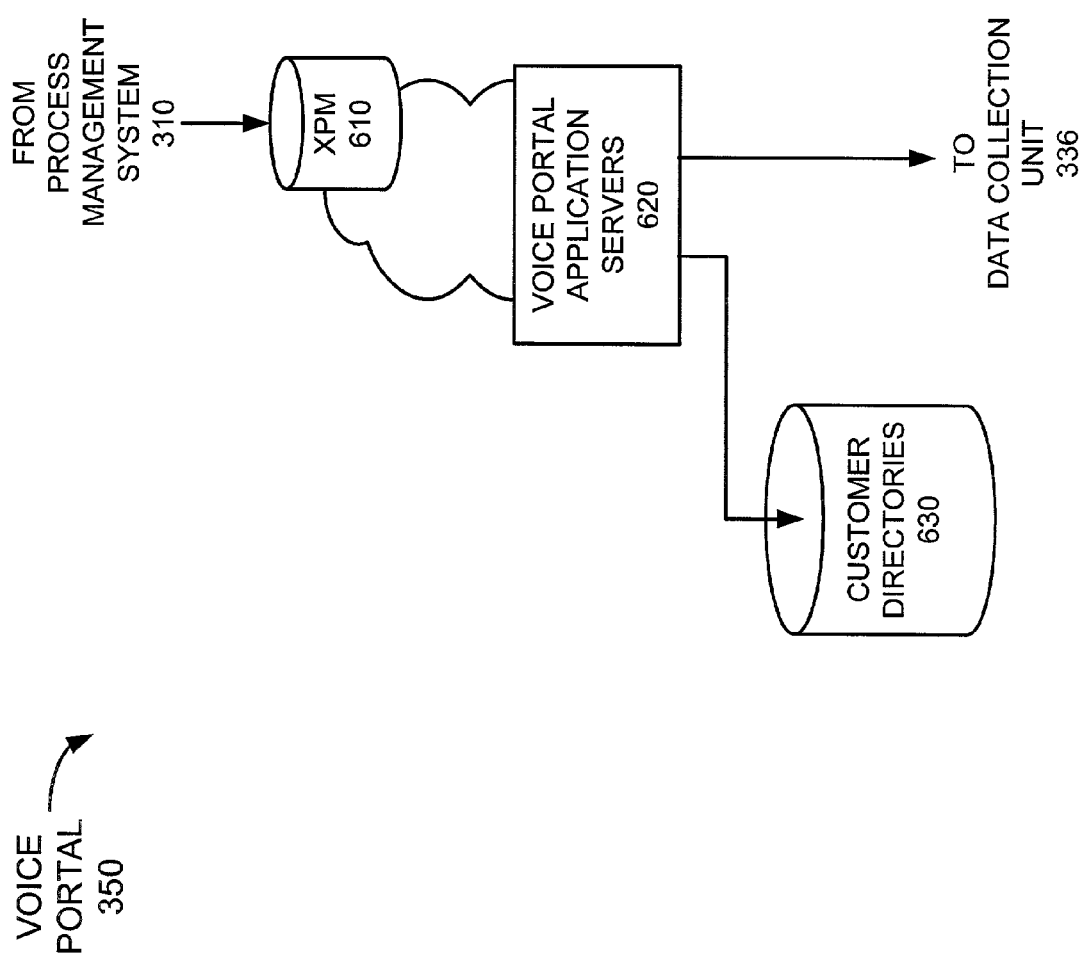
FIG. 6 illustrates an exemplary configuration of the voice portal unit of FIG. 3 in an implementation consistent with the present invention.

FIG. 6 illustrates an exemplary configuration of the voice portal unit 350 of FIG. 3 in an implementation consistent with the present invention. As illustrated, the voice portal unit 350 includes an eXtensible Program Management (XPM) unit 610, one or more voice portal application servers 620, and a customer directory database 630. The XPM unit 610 receives user profile information from the network interface 320 via the process management system 310 and stores this information for use by the voice portal application servers 620. The XPM unit 610 may also receive other information, such as information identifying the device(s) (e.g., personal digital assistant, cellular telephone, pager, etc.) by which the customer wishes to receive the service(s) provided.

The voice portal application servers 620 may include one or more servers that interact with the XPM unit 610 to provide, for example, banking, brokerage, and financial services, travel and entertainment services, distribution and shipping services, insurance services, health and pharmaceutical services, manufacturing services, and the like. Voice portal application servers 620 may also provide data collection unit 336 with information regarding what services are accessed and by whom. The data collection unit 336 may then pass this information on to the billing unit 337 for billing purposes. The voice portal application servers 620 may be located at the OSS 130 or distributed throughout the network 110. The customer directories 630 may store information relating to the services provided by the voice portal application servers 620. For example, the customer directories 630 may store stock quotes, current weather forecasts, real time sports scores, etc.

Figure 7:
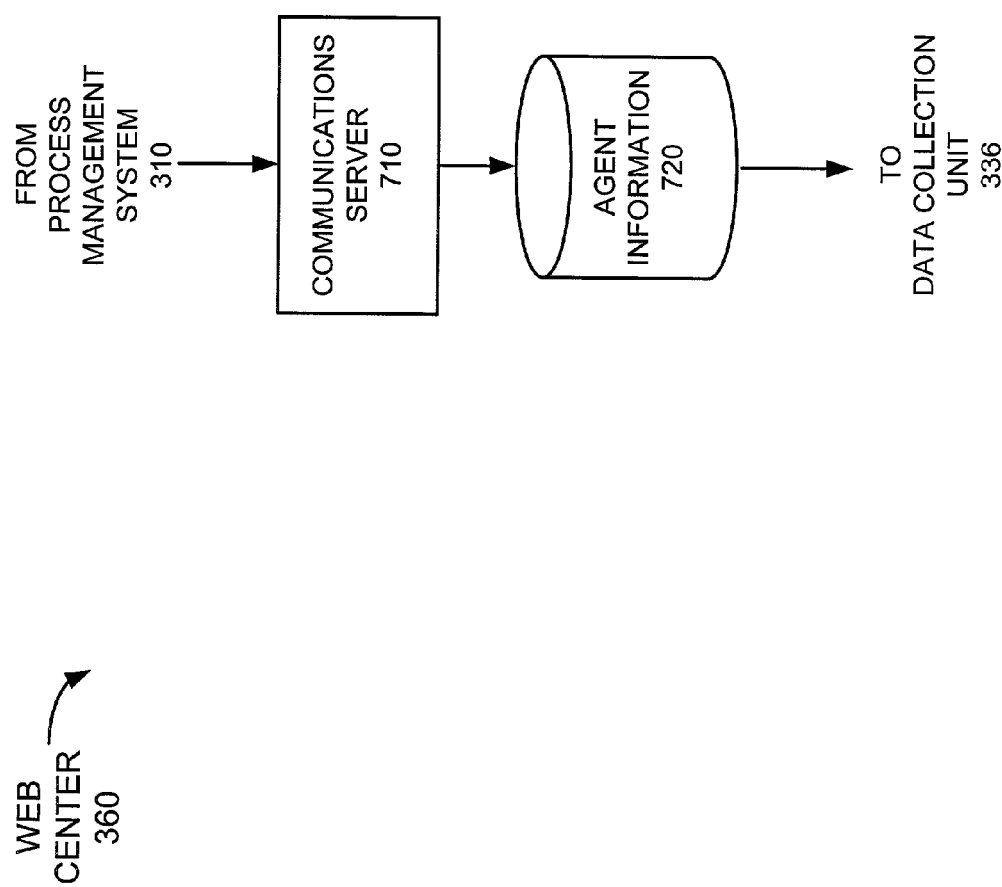
FIG. 7 illustrates an exemplary configuration of the web center of FIG. 3 in an implementation consistent with the present invention.

FIG. 7 illustrates an exemplary configuration of the web center 360 of FIG. 3 in an implementation consistent with the present invention. As illustrated, the web center 360 includes a communications server 710 and an agent information database 720. The communications server 710 queues, routes, and distributes communications from any first location to an appropriate agent at any second location. The communications server 710 may determine the appropriate agent based on data stored in the agent information database 720. The agent information database 720 may store agent activity information, the particular skills of the agents, and the like. Once a customer has utilized the services of the web center 360, the usage information may be transmitted to the data collection unit 336 and then to the billing unit 337 for billing.

Users may, via the network interface 320, provision new services, such as order a toll free number, and/or create new accounts at the web center 360.

Figure 8:
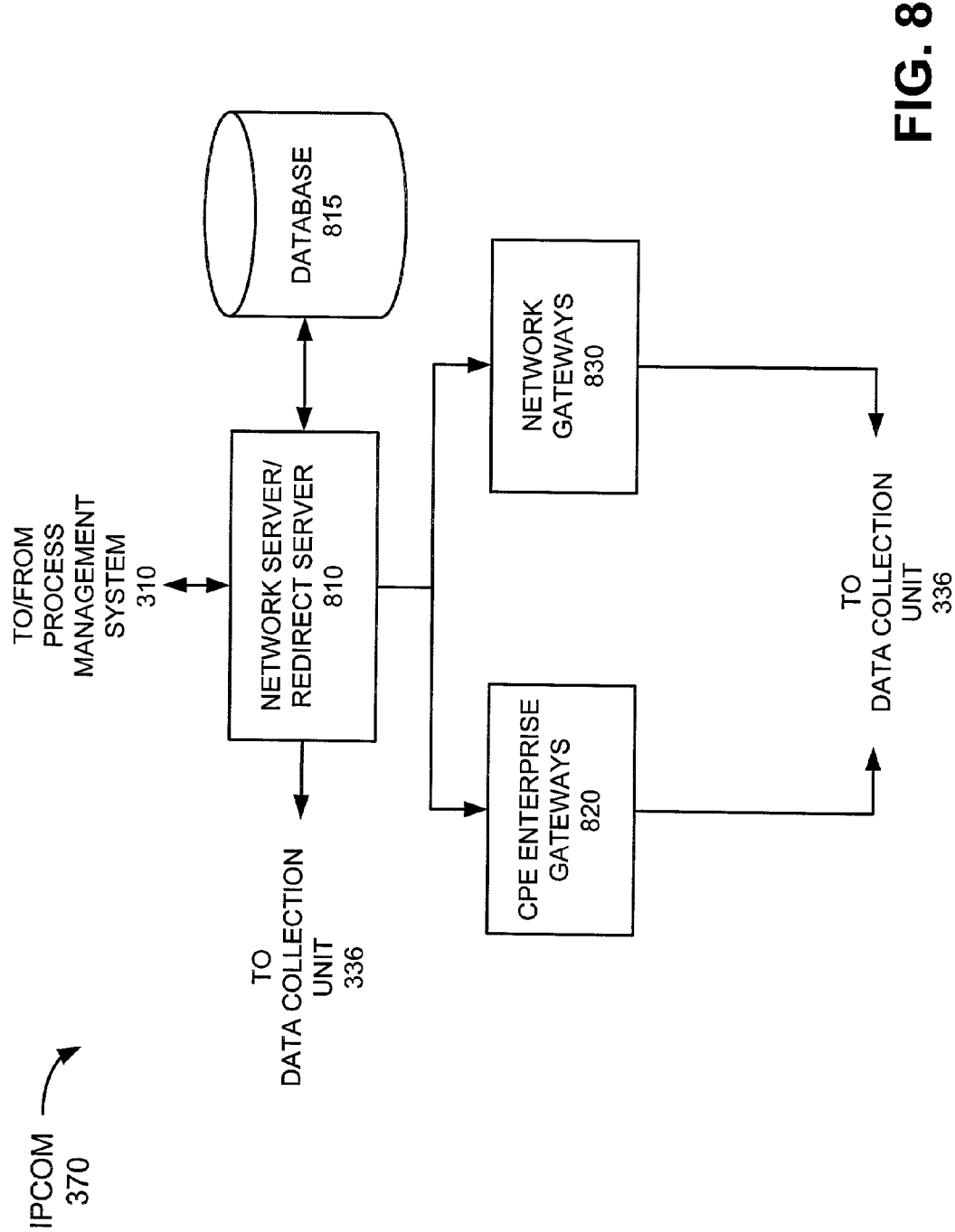
FIG. 8 illustrates an exemplary configuration of the Internet Protocol Communications (IPCOM) unit of FIG. 3 in an implementation consistent with the present invention.

FIG. 8 illustrates an exemplary configuration of the IPCOM unit 370 of FIG. 3 in an implementation consistent with the present invention. As illustrated, the IPCOM unit 370 includes a network server/redirect server 810, CPE enterprise gateways 820, and network gateways 830. The network server/redirect server 810 processes calls made over the IP communications network based on data stored in an associated database 815. The database 815 may store data (or records) relating to call processing (e.g., information identifying the device by which the subscriber wishes to receive the call, network configuration information, etc.), subscriber profiles (e.g., subscriber identifiers), and network-supported features. The network server/redirect server 810 may direct calls to the appropriate gateway 820 or 830 based on this data. The network-supported features may include, for example, follow me, call blocking, call forwarding, voice mail, conference calling, single line extension, call screening, quality of service, class of service, dial-plan restrictions, dynamic registration, secondary directory number, and call transfer.

The CPE enterprise gateways 820 may include one or more gateways for linking customer systems to the IP communications network. The CPE enterprise gateways 820 may, for example, connect to a customer's PBX and convert time division multiplexed (TDM) voice data into VoIP packets and voice signaling into SIP messages. The network gateways 830 include one or more gateways for linking the IP communications network to the PSTN in a well-known manner. The redirect server 810, CPE enterprise gateways 820, and network gateways 830 track customer access and transmit this customer access data to the data collection unit 336 for billing purposes.

Figure 9:
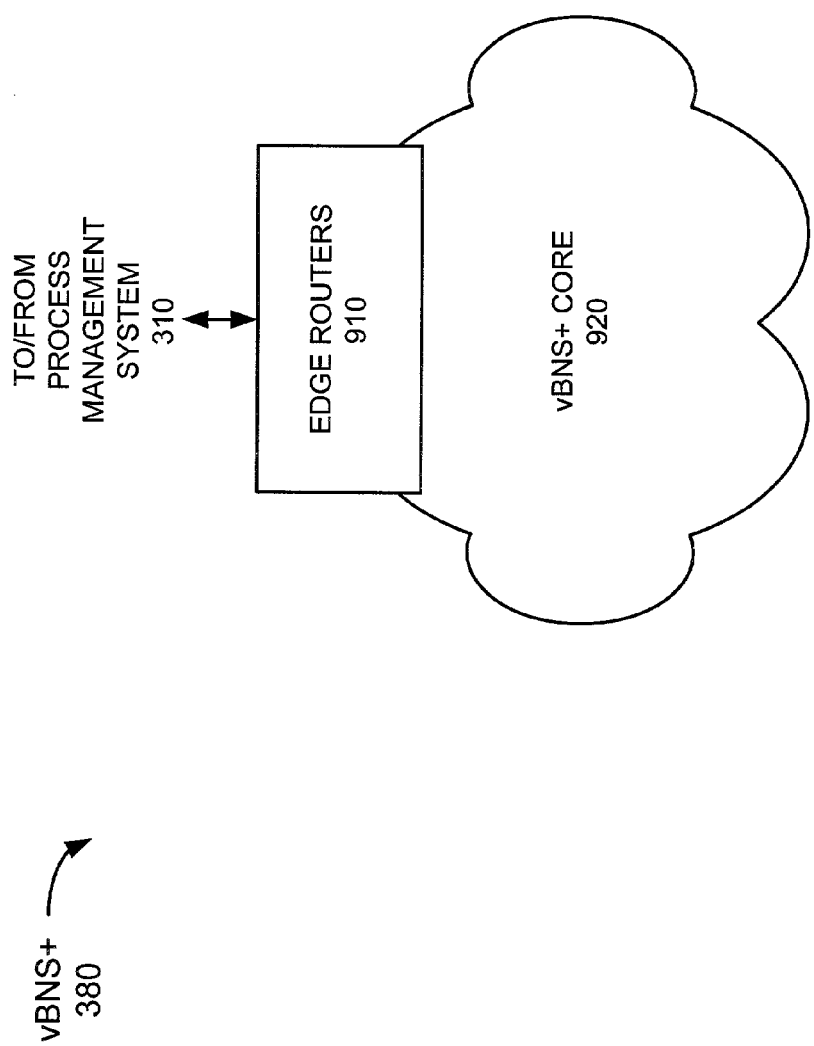
FIG. 9 illustrates an exemplary configuration of the very high performance backbone network service unit of FIG. 3 in an implementation consistent with the present invention.

FIG. 9 illustrates an exemplary configuration of the vBNS+ unit 380 of FIG. 3 in an implementation consistent with the present invention. As illustrated, the vBNS+ unit 380 includes a group of edge routers 910 that route packets to/from the vBNS+ core network 920. The edge routers 910 may connect to the network server/redirect server 810, network gateways 830, customer's CPE equipment, other routers in the IPCom network, directly to SIP telephones, etc. The edge routers 910 may be configured or updated via the network interface 320. The vBNS+ core 920 may include one or more core routers for routing packets between edge routers 910.

The foregoing description of the OSS 130 provides an overview of the components of the OSS 130. A more detailed description of the present invention is provided below.

Exemplary Processing

The redirect server 810 provides IP communications call routing based on a group of subscriber-selected features, such as follow me, call blocking, call forwarding, voice mail, conference calling, single line extension, call screening, quality of service, class of service, dial-plan restrictions, dynamic registration, secondary directory number, and call transfer. Attributes associated with these features may be stored in database 815.

Users may configure and reconfigure these features via the network interface 320. In such a situation, the network interface 320 forwards the new data to the process management system 310, which writes the new data simultaneously to the warehouse 331 and the ODS 332. The process management system 310 also acts as a receiver for data coming from the ODS 332 in the form of formatted provisioning and configuration records destined for the redirect server 810. In this way, the redirect server 810 is kept up-to-date in near real time with the latest information for routing calls in the IP communications network.

When a new redirect server 810 is brought on-line (or an existing redirect server 810 experiences a fault or is down for some period of time), it is important that the new redirect server 810 contain the most recent IP communications service information. In such a situation, the redirect server 810 may perform an audit process in order to retrieve the latest IP communications information. Since the LDAP database 334 offers quick response times for search and retrieval of relatively static information, this audit process typically involves the redirect server 810 accessing and downloading the most recent information from the LDAP database 334. Therefore, it is important that the LDAP database 334 contain the most recent IP communication service information.

Figure 10:
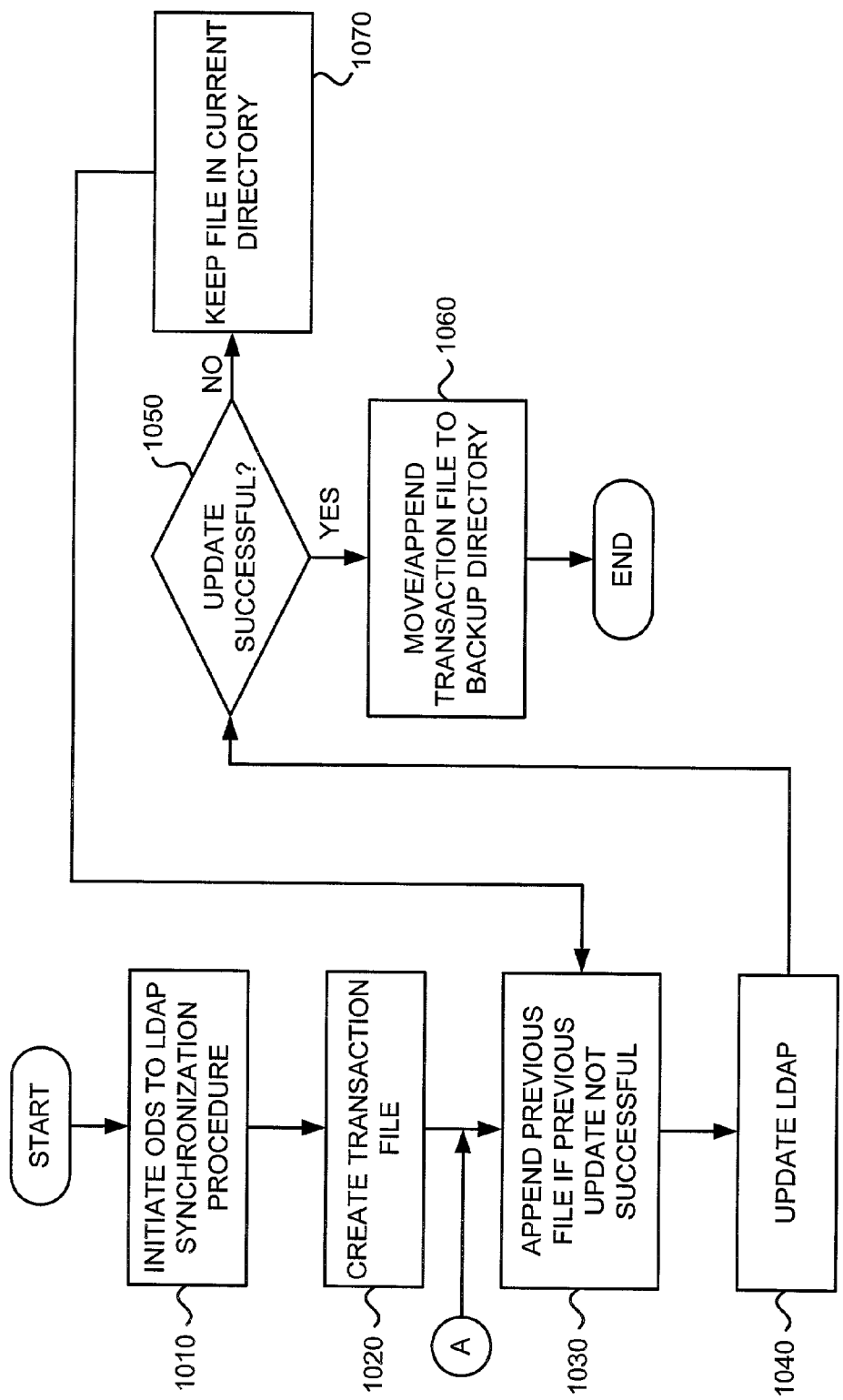
FIG. 10 illustrates an exemplary process for synchronizing the LDAP database with the ODS in an implementation consistent with the present invention.

FIG. 10 illustrates an exemplary process for synchronizing the LDAP database 334 with the ODS 332 in an implementation consistent with the present invention. The ODS to LDAP synchronization procedure may be performed by the ODS 332, the LDAP server 333, and/or some other device (e.g., the process management system 310) in the OSS 130.

Processing may begin with the ODS to LDAP synchronization procedure being initiated [act 1010]. The ODS to LDAP synchronization procedure may be started automatically at configurable time intervals or in response to a command from a system administrator. In one implementation, the ODS to LDAP synchronization procedure is performed automatically every hour. Other time intervals may alternatively be used.

The ODS to LDAP synchronization procedure begins by creating a transaction file [act 1020]. The transaction file identifies new transactions (i.e., additions, deletions, and/or updates to IP communications services/features) that have been made since the last time that the ODS to LDAP synchronization procedure has been run.

Figure 11:
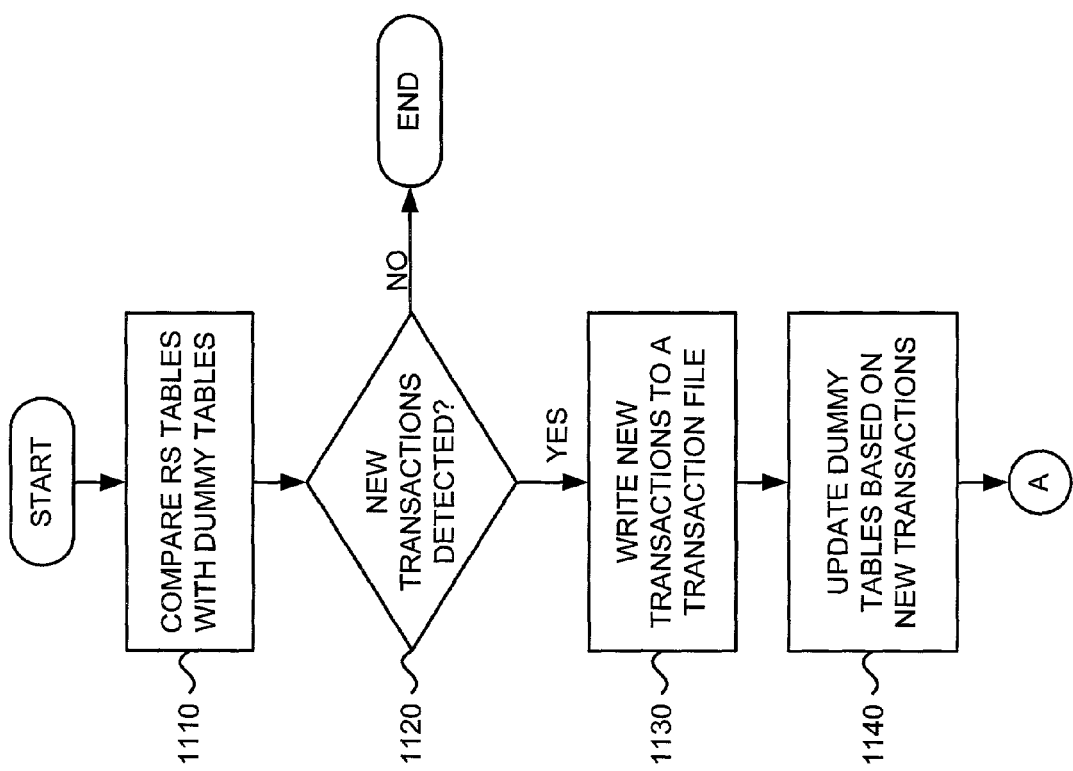
FIG. 11 illustrates an exemplary process for generating a transaction file in an implementation consistent with the present invention.

FIG. 11 illustrates an exemplary process for generating a transaction file in an implementation consistent with the present invention. The ODS 332 may store one or more dummy tables that represent the state of the records in the LDAP 334 the last time that the ODS to LDAP synchronization procedure was run. The ODS 332 may also store one or more redirect server (RS) tables representing the current configuration of the records at the redirect server 810. It should be appreciated that the RS tables contain the most recent updates to the IP communications service features.

Processing begins with the ODS to LDAP synchronization procedure comparing the entries in the RS tables to the entries in the dummy tables [act 1110]. The ODS to LDAP synchronization procedure may then determine whether additions, deletions, and/or updates to the records have occurred [act 1120]. As an example, assume that a customer completely canceled his/her IP communications service during the period since the last ODS to LDAP synchronization procedure operation has been performed. During the comparison performed in act 1110, the ODS to LDAP synchronization procedure would detect that service for that particular customer has been deleted.

If the ODS to LDAP synchronization procedure does not detect any new transactions [act 1120], processing may end. In such an instance, the LDAP database 334 contains the most recent IP communication service information.

If, on the other hand, the ODS to LDAP synchronization procedure detects the presence of one or more new transactions [act 1120], the ODS to LDAP synchronization procedure writes the new transactions to a transaction file [act 1130]. In one implementation consistent with the present invention, the ODS to LDAP synchronization procedure stores each of the new transactions along with an indication identifying the type of the transaction in the transaction file. Exemplary transaction types may include additions, deletions, and updates.

Once the transaction file has been generated, the ODS to LDAP synchronization procedure may update the dummy tables to reflect the new transactions [act 1140]. It will be appreciated that at that particular instance, the records in the dummy tables are exact replicas of the records in the RS tables.

Returning to FIG. 10, the ODS to LDAP synchronization procedure may append one or more previous transaction files to the new transaction file prior to updating the LDAP database 334 in those instances where an attempt to update the LDAP database 334 using the previous transaction file failed [act 1030]. The ODS to LDAP synchronization procedure may then update the LDAP database 334 based on the new transaction file and any appended previous transaction files [act 1040].

The LDAP database update procedure may start with the first transaction in the transaction file and work its way through the entire file. With each transaction, the ODS to LDAP synchronization procedure determines, based on the transaction type indication associated with the transaction, what type of operation is to be performed to the LDAP database 334. For instance, assume that the first transaction is a deletion transaction in which a customer has completely canceled his/her IP communications service. The ODS to LDAP synchronization procedure may delete the appropriate record from the LDAP database 334. In one implementation consistent with the present invention, the ODS to LDAP synchronization procedure generates a log that reflects all changes made to the LDAP database 334 during the update procedure.

Once the entire transaction file has been processed, the ODS to LDAP synchronization procedure may determine whether the LDAP update has been successful (i.e., whether or not each transaction in the transaction file has been properly reflected in the LDAP database 334) [act 1050]. If the LDAP update has been successful [act 1050], the ODS to LDAP synchronization procedure may move (or append) the transaction file to a backup directory [act 1060]. If, on the other hand, an error was experienced while updating the LDAP database 334 to reflect the transactions in the transaction file [act 1050], the ODS to LDAP synchronization procedure may keep the transaction file in the current directory so that it can be appended to the transaction file created in act 1020 during the next ODS to LDAP synchronization procedure [act 1070]. In this way, the ODS to LDAP synchronization procedure ensures that changes made to the records in the ODS 332 are reflected in the LDAP database 334. Moreover, the ODS to LDAP synchronization procedure ensures that any subsequent retrieval of IP communications service information by a redirect server 810 contains the most recent information.

CONCLUSION

Implementations consistent with the present invention provide an operational support system that ensures that updates to new redirect servers (or redirect servers that have experienced a fault or have been off-line for some period of time) reflect the most recent IP communications service information.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, it will be appreciated that the present invention can be implemented in hardware, software, or a combination of hardware and software. Thus, the present invention is not limited to any specific combination of hardware circuitry and software.

Moreover, while series of acts have been described with respect to FIGS. 10 and 11, the order of the acts may vary in other implementations consistent with the present invention. In addition, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A computer-implemented method for updating a lightweight directory access protocol (LDAP) database based on changes made to a second database, the method comprising:
   determining differences between Internet Protocol (IP) communication service records stored in the second database and IP communication service records stored in the LDAP database, information regarding the IP communication service records being stored in a first set of tables and a second set of tables, the second database including the first set of tables and the second set of tables;
   creating a transaction file based on the differences;
   updating the LDAP database using the transaction file;
   determining whether the updating was successful;
   appending the transaction file to a new transaction file to create a second new transaction file when the updating was unsuccessful; and
   storing the second new transaction file.

2. The computer-implemented method of claim 1 where the determining differences occurs automatically at predetermined time intervals.

3. The computer-implemented method of claim 1 where the determining differences is performed hourly.

4. The computer-implemented method of claim 1 where the determining differences occurs based on a command from a system administrator.

5. The computer-implemented method of claim 1 where the determining differences includes:
   comparing one or more first tables containing current IP communication service records with one or more second tables containing IP communication service records from a previous comparison operation, and
   determining, for each difference between the one or more first tables and the one or more second tables, a transaction type.

6. The computer-implemented method of claim 5 where the transaction file includes:
   a list of the differences between the one or more first tables and the one or more second tables, and
   an indication, corresponding to each difference, of the transaction type.

7. The computer-implemented method of claim 6 where the transaction type includes at least one of addition, deletion, or modification.

8. The computer-implemented method of claim 1 where the second database includes an operational data store.

9. A system for updating a lightweight directory access protocol (LDAP) database based on changes made to a second database, the system comprising:
a memory to store a plurality of instructions; and
a processor to execute the instructions to:
compare a first set of tables to a second set of tables, the first set of tables comprising current Internet Protocol (IP) communications information, the second set of tables comprising IP communications information from a previous LDAP database update, the second database including the first set of tables and the second set of tables;
identify, based on the comparing, differences between the first set of tables and the second set of tables;
create a transaction file based on the identified differences;
update the LDAP database using the transaction file;
determine whether the LDAP database update was successful; and
append the transaction file to a new transaction file when the LDAP database update was unsuccessful,
the processor, when identifying the differences, being further to:
identify, for each difference, a transaction type, and
the processor, when creating the transaction file, being further to:
store the transaction type with each difference in the transaction file.

10. The system of claim 9 where the second database includes an operational data store.

11. The system of claim 9 where the processor is further to:
compare the first set of tables to the second set of tables automatically at predetermined time intervals.

12. The system of claim 9 where the processor is further to:
compare the first set of tables to the second set of tables on an hourly basis.

13. The system of claim 9 where the processor is further to:
compare the first set of tables to the second set of tables based on a command from a system administrator.

14. A computer-implemented method for updating a lightweight directory access protocol (LDAP) database, the method comprising:
comparing one or more first tables to one or more second tables, the one or more first tables comprising a set of current records, the one or more second tables comprising records from the LDAP database, and the one or more first tables and the one or more second tables being stored in a second database;
identifying one or more transactions based on the comparing;
storing the one or more identified transactions in a transaction file;
associating a transaction type with each of the one or more identified transactions;
updating the LDAP database using the transaction file;
determining whether the LDAP database update was successful;
appending the transaction file to a new transaction file to create a second new transaction file when the LDAP database update was unsuccessful; and
storing the second new transaction file.

15. The computer-implemented method of claim 14 where the second database includes an operational data store.

16. The computer-implemented method of claim 14 where the storing includes:
storing the one or more identified transactions and the associated transaction types in the transaction file.

17. The computer-implemented method of claim 14 where the comparing occurs automatically at predetermined time intervals.

18. The computer-implemented method of claim 14 where the comparing occurs based on a command from a system administrator.

19. A system for updating a lightweight directory access protocol (LDAP) database, the system comprising:
means for comparing one or more first tables to one or more second tables, the one or more first tables comprising a set of current records, the one or more second tables comprising records from the LDAP database, and the one or more first tables and the one or more second tables being stored in a second database;
means for identifying one or more transactions based on the comparing;
means for updating the LDAP database based on the one or more identified transactions;
means for updating the one or more second tables based on the one or more identified transactions
means for determining whether the LDAP database update was successful;
means for appending the transaction file to a new transaction file to create a second new transaction file when the LDAP database update was unsuccessful; and
means for storing the second new transaction file.

20. The system of claim 19 further comprising:
means for storing the one or more identified transactions in a transaction file, and where the means for updating the LDAP database includes:
means for updating the LDAP database using the transaction file.

\* \* \* \* \*